M. F. CREAHAN.
SHEET COLLATING DEVICE, &c.
APPLICATION FILED JULY 8, 1914.

1,271,281.

Patented July 2, 1918.
2 SHEETS—SHEET 1.

WITNESSES:
E. G. Rennie
V. O. Westphal

INVENTOR:
Michael F. Creahan
BY B. C. Stickney
ATTORNEY.

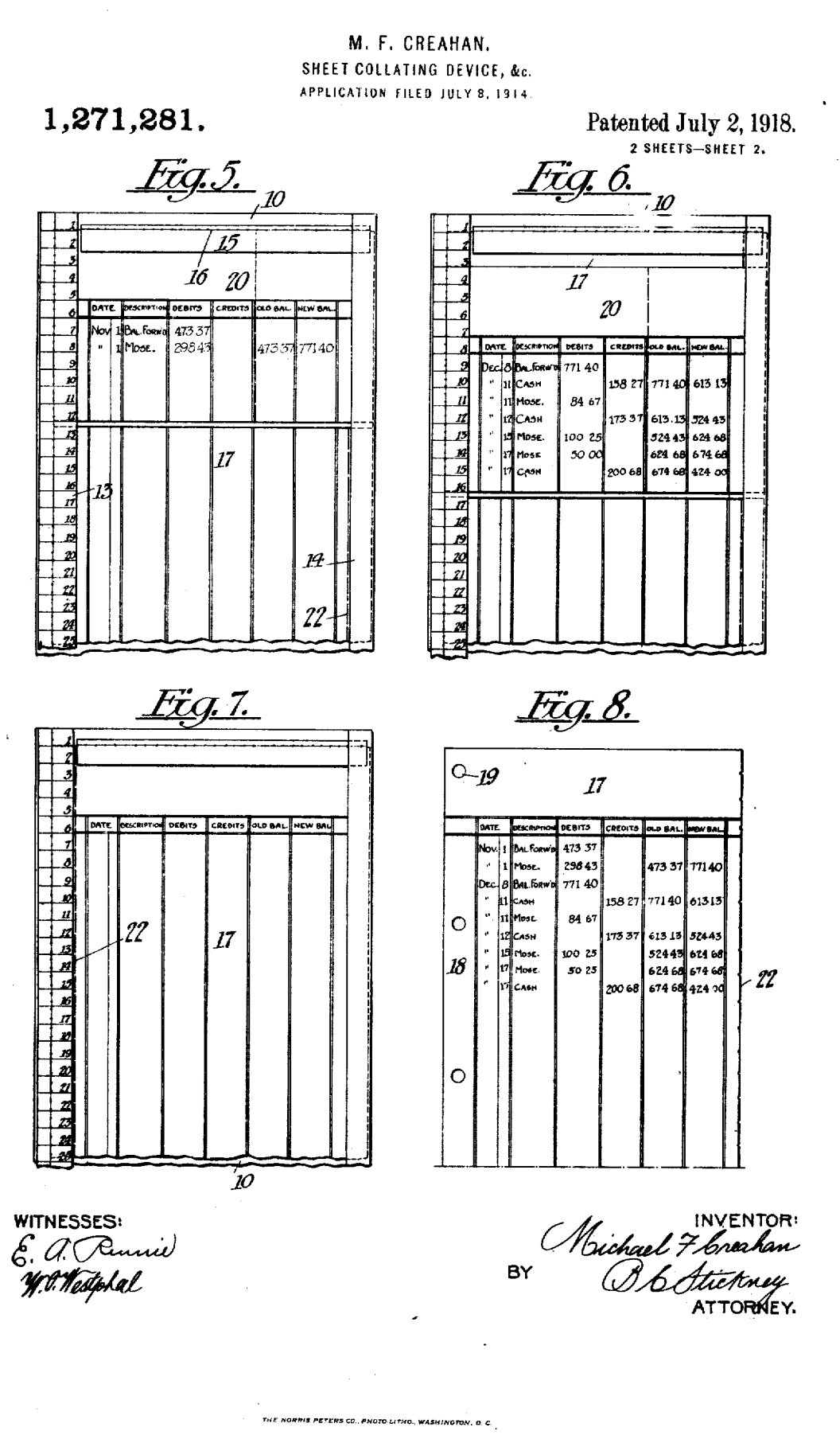

M. F. CREAHAN.
SHEET COLLATING DEVICE, &c.
APPLICATION FILED JULY 8, 1914.

1,271,281.

Patented July 2, 1918.
2 SHEETS—SHEET 2.

WITNESSES:

INVENTOR:
Michael F. Creahan
BY
ATTORNEY.

UNITED STATES PATENT OFFICE.

MICHAEL F. CREAHAN, OF BROOKLYN, NEW YORK, ASSIGNOR TO UNDERWOOD TYPEWRITER COMPANY, OF NEW YORK, N. Y., A CORPORATION OF DELAWARE.

SHEET-COLLATING DEVICE, &c.

1,271,281.

Specification of Letters Patent.

Patented July 2, 1918.

Application filed July 8, 1914. Serial No. 849,645.

*To all whom it may concern:*

Be it known that I, MICHAEL F. CREAHAN, a citizen of the United States, residing in Brooklyn borough, in the county of Kings, city and State of New York, have invented certain new and useful Improvements in Sheet-Collating Devices, &c., of which the following is a specification.

This invention relates to collating sheets for use in assembling thereon commercial sheets such as a ledger sheet, with a statement, invoice or other item sheet, for the purpose of introducing them collectively into a typewriting machine, whereby items written upon the item sheet may in the same operation be recorded upon the ledger sheet or the equivalent thereof, and whereby the item sheets as successively assembled with the ledger sheet may be correctly positioned thereon for the lines of writing upon succeeding item sheets to correspond with consecutive writing lines upon the ledger sheet.

A further object of the invention is to produce a collating sheet of simple and economical character possessing convenient means for readily assembling and gaging thereon the various sheets to be employed therewith, with means for securing the assembled sheets thereon, the collating sheet also having line graduations to permit consecutive numeral designations to statements or invoices to be so adjusted upon the collating sheet that items written thereon may appear on the record sheet in consecutive lines.

In the accomplishment of the above objects I employ for the collating member a relatively stout and strong, though flexible sheet, which may be of stiff paper, providing its opposite side edge surface portions for a sufficient width with retaining flaps for the edge portions of the sheets to be assembled thereon. One of said flaps may consist of a strip secured along a line intermediate its side edges, as by sewing, to the body of the sheet, thereby providing a holder or clip to receive the edge portions of one side of the assembled sheets. The opposite strip or flap may comprise a mere fold in the material of the sheet, which may remain opened out during the assembling of the sheets, and then folded over on the margins of the sheets. When the sheets are introduced between the platen and its feed rolls, the strips will both be held by the pressure of the feed rolls, against the opposite margins of the assembled sheets.

The upper portion of the collating sheet, toward its upper edge, is provided with a horizontal strip secured thereto as by sewing, and affording a pocket and gage to receive and gage or aline the upper edges of the ledger sheet and the first sheet to be employed therewith.

The record or ledger sheet employed with this collating sheet may be reversible, that it may be written upon on both sides, for which purpose a detachable right-hand margin portion may be provided, capable of insertion, upon reversal of the record sheet, within the left-hand fold on the collating sheet, and to allow the left-hand margin of said ledger sheet as reversed, to project into the writing field thereon.

Other features and advantages will hereinafter appear.

In the accompanying drawings,

Fig. 5 is a plan view of a collating sheet having a ledger sheet, carbon sheet, and invoice sheet assembled thereon.

Fig. 6 is a similar view showing the position of a succeeding invoice sheet over the ledger sheet.

Fig. 7 is a similar view of the collating sheet, with the ledger sheet carried thereby in its reversed position.

Fig. 8 is a similar view of a ledger sheet upon which a number of entries have been recorded from succeeding invoices or statements.

Figure 1:
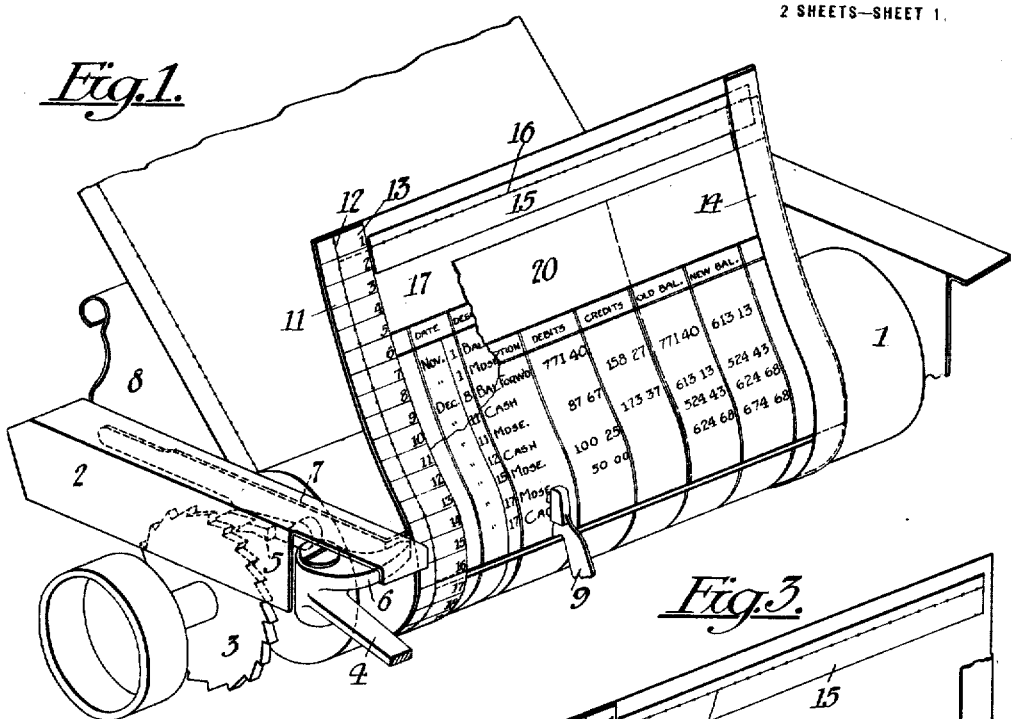
Figure 1 is a perspective elevation of a portion of a typewriter carriage with platen having thereon in operative position my improved collating sheet upon which are assembled a ledger sheet and a statement or invoice.

To properly demonstrate the means of utilizing the collating sheet, it is here shown with a ledger sheet, carbon sheet, and invoice assembled thereon and in operation upon the platen 1 of a typewriting machine, here represented as an Underwood machine, having a carriage 2, line-space wheel 3, and line-space lever 4 comprising an arm 6 to operate a slide 7 and pawl 5, carried thereby. The pawl drives the ratchet wheel 3 to effect line-space rotations of the platen. The paper table 8 is also shown, and a portion of a type-bar 9 is seen in the act of writing upon the assembled sheets.

The collating sheet 10, which may be of stout paper or other suitable flexible material, is shown as provided, upon its left-hand side portion, with a strip 11, which may be of similar or other suitable material. This strip may extend from top to bottom of said sheet, and may be secured in that position as by a line of stitches 12 composed of thread, wire, or other suitable material. The stitches 12 extend in a vertical line between the opposite side edges of said strip 11, said line of stitches being set inwardly from the outer left-hand edges of the strip and collating sheet to maintain the integrity of the union effected thereby. The portion of said strip 11 on the right-hand side of said line of stitches provides a flap 13 with ample seating capacity for the left-hand edges of the sheets to be held thereby. At the same time the extent of said flap is so limited that it will not lie over the writing portions of the work-sheets. At the opposite or right-hand side of the collating sheet its side edge portion is turned over upon the face of the collating sheet, forming a flap 14 extending throughout the length of the sheet 10 and being free to swing open to receive work-sheets laid upon the collating sheet, and then to fold over and secure the right-hand edges of said work-sheets when introducing them into the typewriting machine and as introduced therein.

Before folding the flap 14 over upon the work-sheets to thus secure them, the latter are moved up under a gaging and alining or squaring strip 15 which is placed parallel to the upper edge portion of the collating sheet and near said edge but slightly removed from it, so that it will be at right-angles to the strip 11 and flap 14, said strip 15 being secured to the sheet 10 as by a line of stitches 16, the method of connection employed preferably corresponding to that for the strip 11.

In employing the collating sheet, a record sheet, such as the ledger sheet 17, is placed thereon with its left-hand edge portion 18 inserted beneath flap 13, and the sheet 17 is then moved upwardly to gage it with its upper edge alined and covered by the gage strip or flap 15. The sheet 17 may be provided with means, as apertures 19, for loose-leaf binding. An invoice or other item sheet, as 20, to receive the original typewritten entry is then imposed upon the ledger sheet, being gaged and alined in the same way, over an intervening carbon sheet. Then the flap 14 at the right-hand side of the collating sheet is turned over upon the sheets and the whole introduced to the platen in the usual manner, the strip 15 forming an introductory sheet edge binding to facilitate entry of the several sheets between the platen and feed rolls of the typewriting machine in the usual manner for feeding across the printing portion of the platen, as under the operations of the line-spacing mechanism.

Writing is then performed upon the invoice, upon the completion whereof the collating sheet with its assembled work-sheets is removed from the machine. After noting the line number for the last entry that had been made upon the invoice, the latter is removed, and a new invoice may subsequently be inserted in its place, the new invoice being so adjusted upon the ledger sheet with relation to the graduations or scale 20$^a$ upon the strip 13 of the collating sheet, that the first line of writing upon the new invoice will be in alinement with the graduation next succeeding the graduation whose numeral indicated the last line of writing of the old invoice. Therefore since the ledger sheet remains in its original gaged and squared position upon the collating sheet, the new invoice will have its top edge at a point distant from the top edge of said collating sheet and away from the strip 15, wherefore said new invoice will be supported upon the collating sheet by the flaps 13 and 14 alone. This new invoice, and also succeeding invoices, will be adjusted with sufficient accuracy in their positions by squaring them against one of the seats afforded by the flaps 13 or 14, but the ledger sheet will always be positively alined and gaged in the manner stated, so that succeeding lines may appear thereon, as different invoices are recorded thereover, with a proper degree of accuracy.

When the ledger sheet 17 has become filled, it may be reversed and its detachable margin portion 21 can be inserted under the flap 13, its upper portion being gaged and alined with the strip 15 as before. With the detachable margin portion 21 thus engaged, the perforated or weakened line 22 thereof will extend just outside of the flap 13, (see Fig. 7) to allow writing upon the reverse side of the ledger sheet up to the terminal edge thereof, represented by said line 22; the marginal portion 21 comprising a merely temporary marginal portion whereby the ledger sheet in its reversed position may be supported upon the collating sheet.

Figures 2, 3, 4:
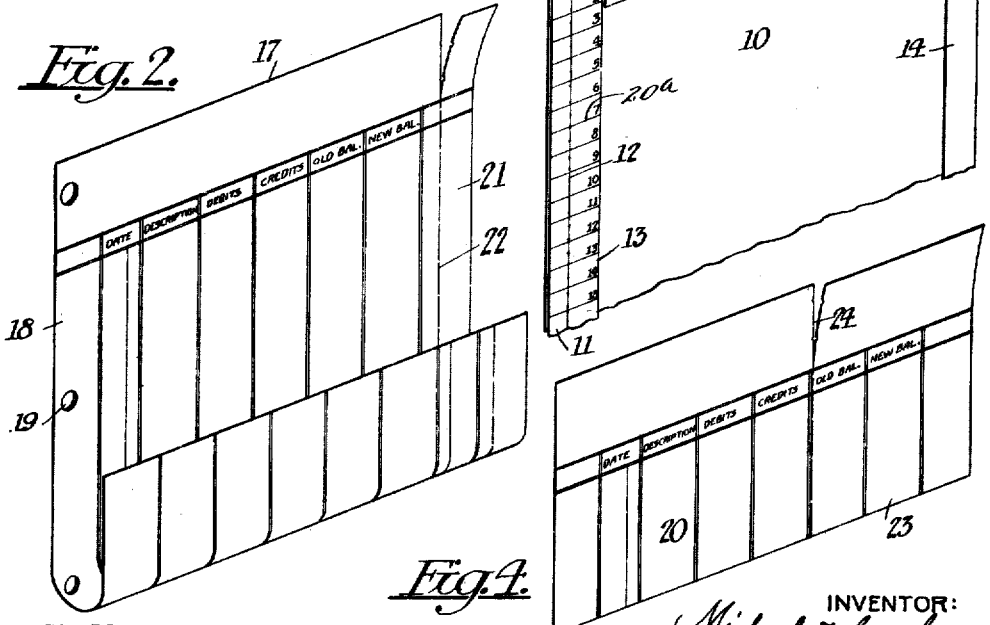
Fig. 2 is a perspective view of a ledger sheet turned up at the bottom to show that it is provided with rulings on both sides, and having a right-hand detachable strip.
Fig. 3 is a perspective partial view of the collating sheet, partially broken away.
Fig. 4 is a similar view of an invoice sheet having a detachable portion.

The bills or invoices used with this ledger sheet are preferably of equal width with the ledger sheet, in order that they may, at all times, be capable, at their opposite side portions, of engaging beneath the flaps 13 and 14 in the manner described, and in cases where it is desired to employ any bills or invoices of less width, they may be provided with detachable right-hand portions. In Fig. 4 will be seen an invoice 20 having a detachable portion 23, and a divisional, weakened or perforated line 24 allowing the severance; the right-hand detachable portion comprising, if desired, a stub portion containing items like records of old balance and new balance, which may have been impressed thereon, and consequently recorded also upon the ledger sheet in the appropriate columns thereof. Said stub portion may thus have served the purpose of supporting the invoice on the collating sheet, and may or may not have other uses.

In addition to its service as a binder for the right-hand edge portions of the work-sheets, in securing them upon the collating sheet 10 when the assembled sheets with the collating sheet are passing through a typewriting machine, the right-hand flap 14 upon the collating sheet is necessary to provide at the right-hand side a thickness equal to the thickness at the left-hand side, in order that the collating sheet with its assembled work-sheets may pass evenly between the platen and feed rolls, because, in the absence of the flap 14 or its equivalent, the difference in thickness at the right and left-hand sides of the passing sheets, due to the presence of the strip 11, would cause feeding askew, as is obvious.

Variations may be resorted to within the scope of the invention, and portions of the improvements may be used without others.

Having thus described my invention, I claim:

1. A collating device for work-sheets to be placed in a typewriting machine having a round platen, said device comprising a flexible backing sheet having a strip stitched at one side thereof to enable said device to readily conform to the typewriter platen, said strip forming an overlap, the overlap having a scale to coöperate with a similar scale on the work-sheet, said backing sheet also having on the side opposite said strip a flap foldable to overlie the work-sheets, and also having a flap parallel to the leading edge of the backing sheet and extending between said before-mentioned flaps, and terminating short of both, said last-named flap spaced from the leading edge to permit the device to enter readily between the typewriter platen and the usual pressure rolls.

2. A collating device for work-sheets to be placed in a typewriting machine having a round platen, said device comprising a flexible backing sheet having a flap stitched thereto adjacent and parallel to the leading edge, but spaced from said edge and forming a holder for one of the work sheets, and also comprising a flap fixed to one side of the backing sheet and forming a side holder for the work sheets, said flap at the leading edge terminating short of the said side flap.

MICHAEL F. CREAHAN.

Witnesses:
W. O. WESTPHAL,
JULIUS DUCKSTINE.

Copies of this patent may be obtained for five cents each, by addressing the "Commissioner of Patents, Washington, D. C."